United States Patent
Wu

(10) Patent No.: US 11,531,961 B2
(45) Date of Patent: Dec. 20, 2022

(54) METHOD OF MANAGING INFORMATION FOR THE SUPPLY CHAIN OF A PERISHABLE COMMODITY

(71) Applicant: Frederick Wu, Danville, CA (US)

(72) Inventor: Frederick Wu, Danville, CA (US)

( * ) Notice: Subject to any disclaimer, the term of this patent is extended or adjusted under 35 U.S.C. 154(b) by 0 days.

(21) Appl. No.: 17/010,695

(22) Filed: Sep. 2, 2020

(65) Prior Publication Data
US 2022/0335367 A1 Oct. 20, 2022

(51) Int. Cl.
*G06Q 10/08* (2012.01)
*G06Q 20/20* (2012.01)
*G06Q 10/04* (2012.01)

(52) U.S. Cl.
CPC ......... *G06Q 10/087* (2013.01); *G06Q 20/203* (2013.01)

(58) Field of Classification Search
CPC .................. G06Q 10/087; G06Q 20/203
USPC ........................................................ 705/28
See application file for complete search history.

(56) References Cited

U.S. PATENT DOCUMENTS

| | | | | |
|---|---|---|---|---|
| 7,881,986 | B1 * | 2/2011 | Pape | G06Q 10/087 705/28 |
| 7,921,030 | B1 * | 4/2011 | Verma | G06Q 10/04 705/28 |
| 8,447,664 | B1 * | 5/2013 | Pape | G06Q 10/087 705/28 |
| 2012/0271740 | A1 * | 10/2012 | Connors | G06Q 10/087 705/28 |

* cited by examiner

*Primary Examiner* — Garcia Ade
(74) *Attorney, Agent, or Firm* — Theodore J. Bielen, Jr.

(57) ABSTRACT

A method of managing information concerning the supply chain of a perishable commodity utilizing a data repository capturing multiple data sources. The method further includes the collating of the data into a chain of custody information representation for use by data contributors.

23 Claims, 4 Drawing Sheets

METHOD OF MANAGING INFORMATION FOR THE SUPPLY CHAIN OF A PERISHABLE COMMODITY

CROSS-REFERENCES TO RELATED APPLICATIONS

The present application claims the benefit of U.S. provisional patent application 62/895,789, filed 4 Sep. 2019.

BACKGROUND OF THE INVENTION

The present application relates to a novel and useful method for managing information concerning the supply chain of a perishable commodity during a set period of time.

The journey of perishable goods from the growing environment to the consumer has been found to be quite important to prevent spoilage of perishable goods. It has been estimated approximately 12% of food waste occurs during the distribution process, mainly because of improper refrigeration. Temporary temperature abuses occurring during the cold chain movement of the perishable good has been noted as decreasing the remaining shelf life of such perishable goods and affecting food safety.

A chain of custody graphic of a perishable product is important to represent the journey of a product through the entire supply chain, from harvesting to the point of purchase by a consumer. In other words, the events between harvesting and purchase by a consumer is germane to ascertain the effect of such events on the perishable goods during its journey. To properly construct a chain of custody representation, inputs must be obtained from various participants within the supply chain. In other words, no single entity has comprehensive information on the entire journey of a perishable good.

In the past, only partial chain of custody pictorials have been constructed and are based only on the capture of data by participants who are willing to show that data. In addition, the amount of information required in the past has been too onerous and expensive in its creation. In addition, many industry practices and protocols are blatantly being ignored, which has resulted in representations of the chain of custody being inaccurate and misleading.

In essence, a user intending to obtain chain of custody information must spend a considerable amount of time and energy logging on to different applications, which are often redundant. For example, an employer transporting a temperature logger does not have access to the data obtained by the temperature logger. Such data is made available by the manufacturer of the logger by the entity who receives the logger and puts the same into use.

A similar situation exists with respect to food safety since information on the same is not captured or is captured in disparate data sets with a specific application for each data set. Moreover, there is no comprehensive view available of audits and inspections of perishable commodities during the supply chain. Audits and inspections under established practices and protocols are only available at specific stages of the supply chain for perishable goods. For example, a grower is only aware of the product conditions from inception to harvest. Also, a shipper only has food safety protocols that cover conditions present at the shipping facility. Needless to say, the distribution centers in retail stores each have their own food safety protocols that are unique to a particular stage of the supply chain. Broadly viewing the present situation, no sort of entity possesses the capability to know if other entities in the supply chain have passed a particular perishable commodity during inspections.

In summary, there are no data systems in existence that merge together or intercept to reveal patterns, efficiencies, problems, or solutions associated with the supply chain of a perishable commodity.

A system and a method for managing and collating information regarding the supply chain of a perishable commodity into an accessible, central repository for information having multiple benefits would be a notable advance in the field of food processing.

SUMMARY OF THE INVENTION

In accordance with the present application, a novel and useful method of managing information concerning the supply chain of a perishable commodity for a specific time duration is hereinafter described.

The method of the present application includes the establishment of an infrastructure layer that includes data capture, storage, formatting, and integration of the same. Data is captured from sensors that pertain to the location and physical properties of the perishable commodity at predetermined periods of time. Also, transactional data from entities interacting with the perishable goods during its travel through the supply chain is also captured. In addition, other inputs, such as inspection results, sensor data, and existing data storage databases, are fed into the data repository, referred to as a "middle layer". In such a process of capturing and storing pertinent data, a transaction gateway is established to accommodate various data input formats and translating data from one format to another, in a back and forth manner.

The stored data will then be collated into a chain of custody information representation which identifies sequential entities interacting with the perishable commodity as well as other information, such as the path identification, identification for a particular commodity, physical attribute of a commodity, such as temperature, humidity, and the like, the particular location of the perishable commodity at a particular time, and the like.

Also, an immutable "gold copy" of any data supplied by a transactional participant may be created for the sake of security. Such a copy of the data would be available to the user at any given time.

Once the chain of custody representation is created, users may selectively retrieve information concerning attributes of the perishable goods through the chain of custody. Such information would include the path, duration, identification of an entity, location of the perishable goods, and the like. In addition, status of the quality or shelf life of a commodity may be found at any step of the supply chain represented by the chain of custody diagram or representation.

Needless to say, data acquisition and storage will be accomplished through the use of known technologies, such as blockchain, and distributed ledger technology, as well as cloud storage capabilities. Access to the user through the internet is also created with the method of the present application. Further, assessments as to the quality of the goods during the supply chain journey may also be determined.

It may be apparent that a novel and useful method of managing information concerning the supply chain of a perishable commodity has hereinabove been described.

It is therefore an object of the present application to provide a method of managing information concerning the supply chain of a perishable commodity which coordinates data from different supply chain sources to create a centralized repository of data which is accessible by users for various purposes.

Another object of the present application is to provide a method of managing information concerning the supply chain of a perishable commodity which efficiently obtains data on the perishable commodity from various sources and possesses data security and access to a central repository for such data.

Another object of the present application is to provide a method of managing information concerning the supply chain of a perishable commodity that uses a central repository of data that allows data modeling, predictive/prescriptive analytics, demand forecasting, trend analysis, alert generation, traceability, and other supply chain efficiencies.

Another object of the present application is to provide a method of managing information concerning the supply chain of a perishable commodity that develops an infrastructure layer for data that creates a conjunctive application layer as well as a business model layer to derive therefrom.

Another object of the present application is to provide a method of managing information concerning the supply chain of a perishable commodity that allows the creation of a chain of custody information representation or diagram which accurately determines the quality and shelf life of the perishable commodity within the supply chain, which may take the form of a cold chain.

A further object of the present application is to provide a method of managing information concerning the supply chain of a perishable commodity that connects disparate data sets contributed by multiple entities through a transactional gateway which accommodates various systems of data and is capable of translating data from one format to another.

Another object of the present application is to provide a method of managing information concerning the supply chain of a perishable commodity that utilizes a unique identifier for a particular quality of the perishable commodity and follows the perishable commodity through the supply chain journey.

Another object of the present application is to provide a method of managing information concerning the supply chain of a perishable commodity which allows a user to determine problems associated with the perishable commodity through the supply chain and that allows interaction and exchange of data between transactional entities interacting with the perishable commodity through the supply chain.

A further object of the present application is to provide a method of managing information concerning the supply chain of a perishable commodity which reveals the conditions of the supply chain journey of the perishable commodity and permits a consumer to exercise a choice in purchasing the perishable commodity.

Another object of the present application is to provide a method of managing information concerning the supply chain of a perishable commodity that incorporates information from the grower, shipper, distribution center, and retail store, as well as inspections associated with each of these entities at various times of the journey of the perishable commodity through the supply chain.

Another object of the present application is to provide a method of managing information concerning the supply chain of a perishable commodity that possesses the ability to create alerts based on data collected to a central repository and to allow users of a central repository to make commercial decisions as to the use of the perishable commodity.

Another object of the present application is to provide a method of managing information concerning the supply chain of a perishable commodity that is capable of providing analytics that can be used for applications involving artificial intelligence and other modeling systems.

The application possesses other objects and advantages especially as concerns particular characteristics and features thereof which will become apparent as the specification continues.

For a better understanding of the application, reference is made to the following detailed description of the preferred embodiments thereof, which should be referenced to the prior described drawings.

DETAILED DESCRIPTION OF THE PREFERRED EMBODIMENTS

Various aspects of the present application will evolve from the following detailed description of the preferred embodiments thereof which should be referenced to the prior delineated drawings.

Figure 1:
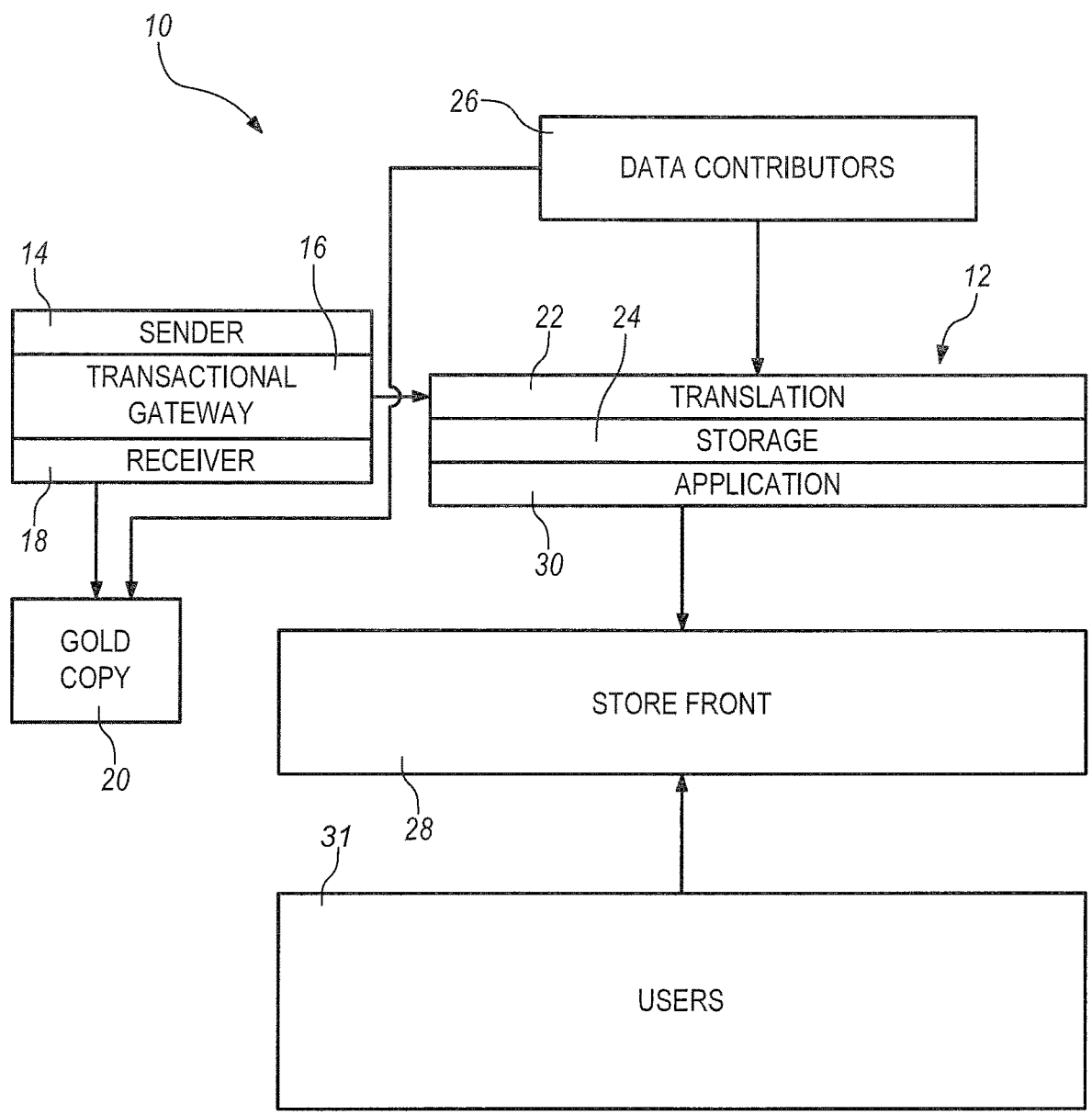
FIG. 1 is a block diagram outlining the data and information method of the present application.

The application concerns a method of managing information or data concerning the supply chain of a perishable commodity on its journey through the supply chain. The method of the present application involves the creation of an infrastructure layer 10, FIG. 1. Infrastructure layer 10 includes the creation of a middle layer 12 which is the repository for the data associated with the method of the present application. Such data may come from various origins.

For example, a sender would provide transactional data with respect to the perishable commodity. That is to say, such sender would be an entity that interacts with the perishable commodity through its supply chain travels. The sender would provide data in the form of data sets including, but not limited to purchase orders, invoices, advanced ship notices, functional acknowledgements, credit/debit memos, load tender, and international shipments, to name a few. Each data set from the sender 14 gets filtered through the transactional gateway 16. Transactional gateway 16 will accommodate various methods of translating data from one format to another, including but not limited to EDI, CSV, XML, JSON, API, and blockchain. In addition, other informational templates such as Excel and CSV files will be accepted from senders having little or no technology options. It should also be realized that XML or PDF will originate from audit or inspection templates or various food safety programs, such as HACCP, GAP, GMP, and the like. Data received from senders 14 are then translated to the appropriate receiver. A "gold copy" 20 of the data provided by the sender is automatically written to virtual machines in the cloud. The purpose of the "gold copy" is to authenticate the data that the sender provides to the transactional gateway and data forwarded from the transactional gateway to the middle layer 12. The "gold copy" 20 is retained on behalf of the sender receiver and is made available for viewing at any time to ensure that the data provided by the sender has not been tampered with or altered in any way. Transactional gateway 16 send data to the translation portion 22 of middle layer 12 in an appropriate format which will then be passed to the storage 24 of middle layer 12.

In addition to the transactional data provided by sender 14, sensor data is provided by direct contributors 26. Such data contributors may include data loggers for temperature, food safety plans, audit and inspection information, point of sale information, weather applications, GPS location, and consumer insights.

Storefront 28 receives the information from data storage 24. Information from applications layer 30 is also sent to storefront 28. Such applications sent to storefront 28 may include the chain of custody information, reports, analytics, food safety plans, audit and inspection, certifications, collaboration platforms, weather, blogs, demand forecasting information, and the like. Users 31 are able to access any of such items from the storefront 28. Such access may be made available through the payment of a fee accessing and downloading the same.

Figure 2:
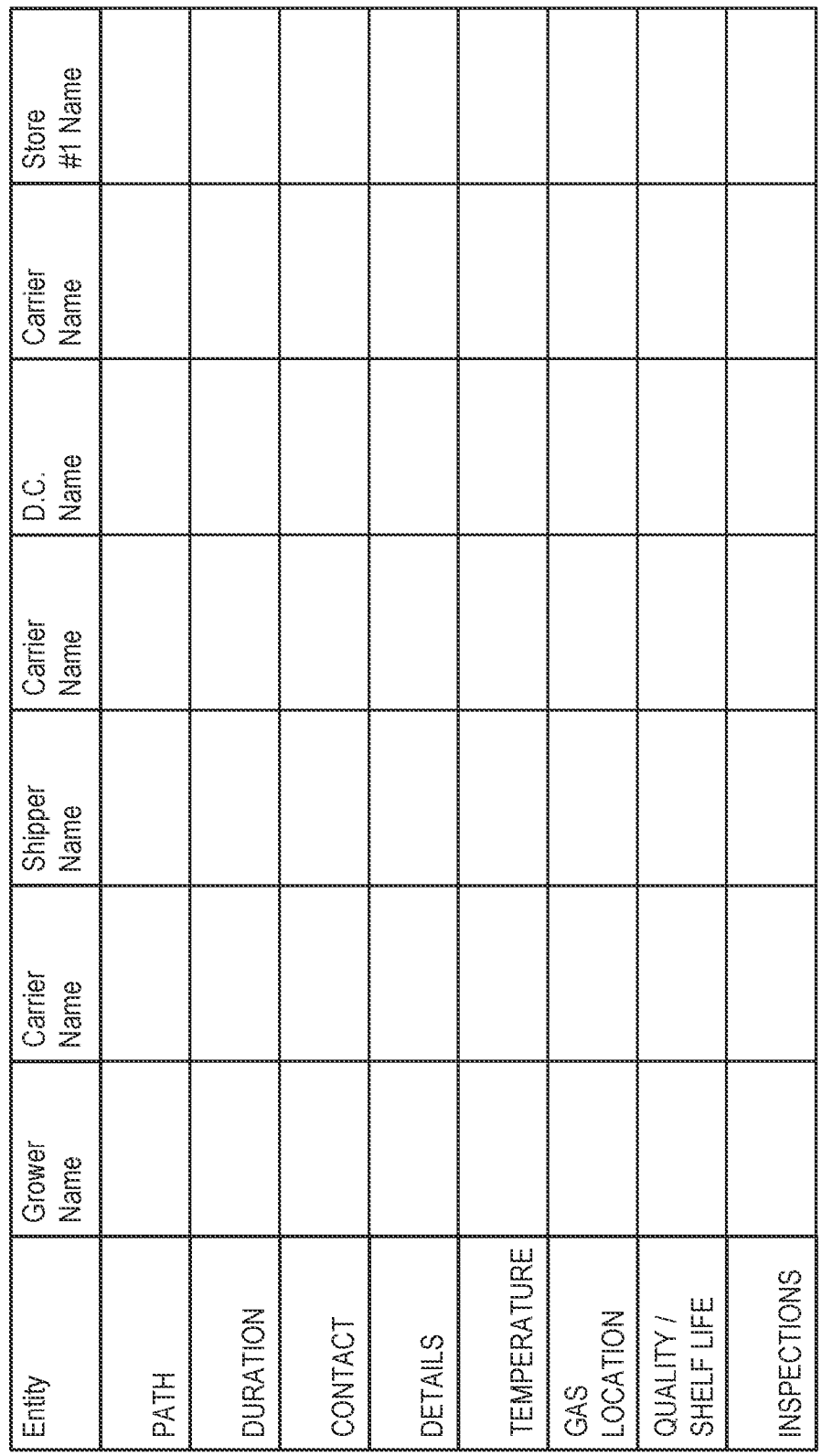
FIG. 2 is a schematic showing representation or a diagram of the chain of custody of a particular perishable commodity.

With reference to FIG. 2, it may be observed that a chain of custody diagram or presentation 32 is shown and is available to the users 31 by a simply clicking on a computer screen display noted as "chain of custody" in the storefront 28. Chain of custody diagram 32 is a practical, organized, and efficient pictorial representation of the journey of perishable commodity through the supply chain. The chain of custody diagram 32 includes a multitude of levels in the chain of custody that are derived from the disparate data sets found in the storage 24 of the middle layer 12. In other words, users 31 are allowed to view the data that affects the product at each leg and at each entity within the supply chain. Although, such entities are identified in FIG. 2, a greater number of entities may be displayed. For example, it is possible that the perishable goods passing through the chain of custody, directional arrow 34, include a plurality of stores, for example, eight different Walmart stores. Users 31 have the option of selecting particular the levels in which they have interest for each entity.

The levels displayed by FIG. 2 for a particular entity include PATH, which is the date and time each entity took possession of the product and the date time each entity surrendered possession of the product.

DURATION indicates the elapsed time calculated from the date and time each entity took possession and surrendered possession of the perishable products. DURATION answers the question of "How long?" and helps determine delays, shelf life lost, and the like.

CONTACT identifies the details for identifying each entity. This allows the users to quickly access each entity identified to resolve problems and questions that arise.

DETAILS provides critical reference information that is necessary for each entity with specific references to the users' business documents, such as work orders, field tickets, purchase orders, invoices, and the like. Also, the quantity of the perishable goods that have been shipped, as well as reference numbers for each unit of such quantity, are revealed.

TEMPERATURE pertains to the temperature of the perishable goods, while in possession of each entity, as shown.

GPS LOCATION indicates the exact GPS location of the shipment is found, if available.

QUALITY SHELF LIFE defines the quality shelf life of the perishable goods may be estimated according to an algorithm or calculation used in the middle layer.

INSPECTIONS identifies the required and available inspections performed on the perishable goods is shown.

With respect to quality shelf life, other systems exist in this determination. Of note, is a shelf life determination identified as the alpha numeric quality code (ANQC) which includes three of the most important performance metrics in the cold chain. The metrics include cut-to-cool time, transportation quality, and accumulated shelf life lost. The ANQC system results in a three-digit code that was created by Dr. Ishmail Uysal at the University of Southern Florida.

The key reference number for each group, such as a pallet, of the perishable goods may take the form of using an ID tag known as "iTOKEN", which is a label owned by Deltatrak, Inc. of Pleasanton, Calif. The iTOKEN label can be associated with each pallet of the perishable goods and provides traceability throughout the supply chain, indicated by the chain of custody diagram of FIG. 2. In other words, such identifier will remain with a particular portion of the perishable goods throughout shipment of the same through the supply chain and during transfer of ownership along the supply chain.

With reference again to application layer 30 of middle layer 12, four key processes may be included therein. For example, data input into infrastructure middle layer 12, asset tracking, predictive modeling, and feedback are realized. Analytical insight may result from application layer 30 in the form of the ANQC, which has been discussed hereinbefore. Other analytics may derive from application layer 30, such as efficiency of warehouse management, supply chain optimization, shipping routing, marketplace sales, scorecarding for food safety modeling, reduction of shrink of perishable goods, and improved efficiency in other aspects of the supply chain.

Figure 3:
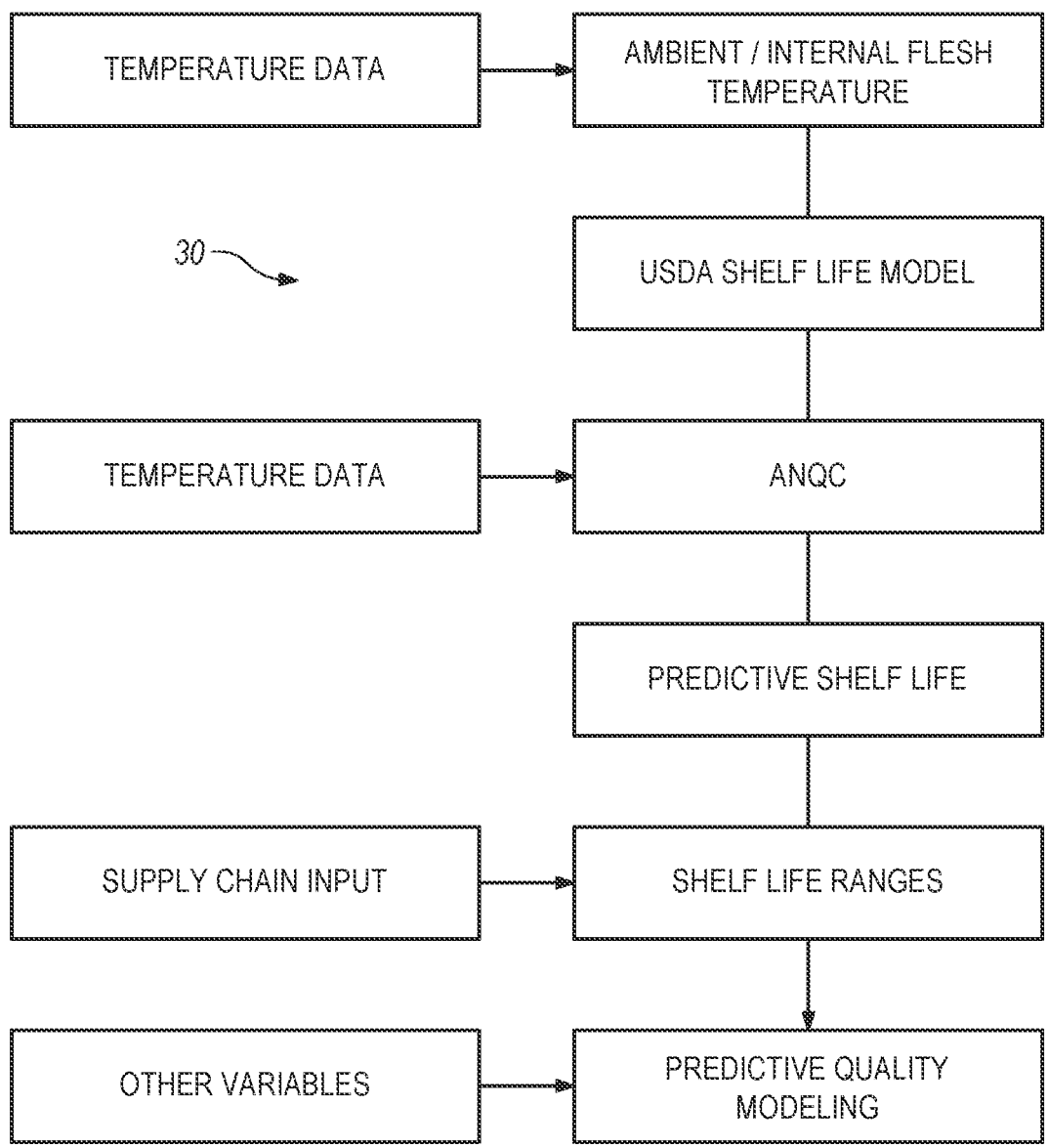
FIG. 3 is a block diagram which indicates the inputs and model hierarchy of the system using the method of the present application.

FIG. 3 represents an overall view of the application layer 30 which results in the generation of predictive and preventative modeling. For example, spoilage and inefficiency losses can be better identified by the use of additional data collection. Quality losses at points of transaction can be better identified and remedied. And the contribution is multi-active participation can be better assessed. Such are a few examples of created applications in the method of food analysis.

Figure 4:
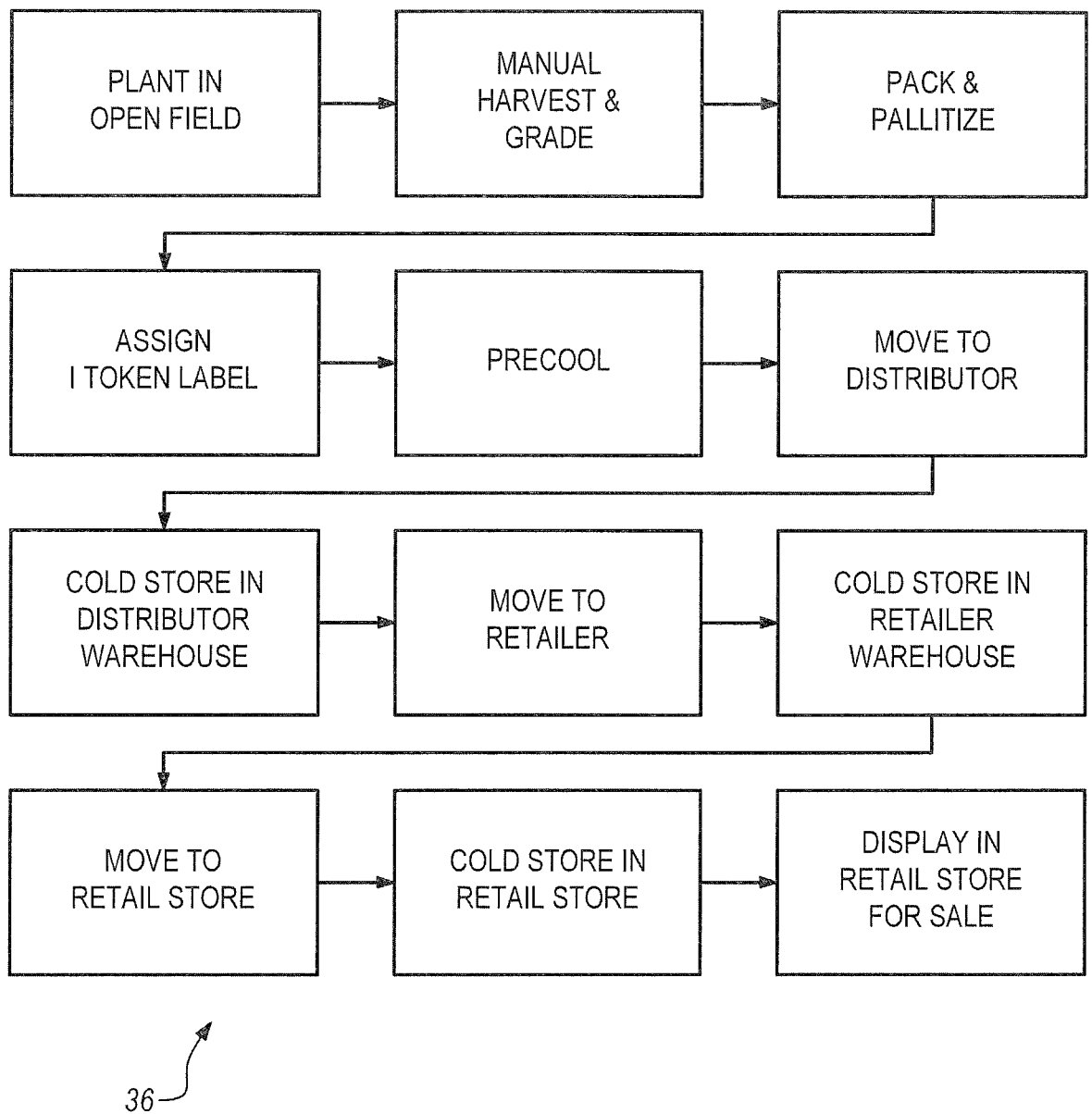
FIG. 4 is a block diagram showing a typical progression of strawberries as a perishable commodity through the supply chain.

Turning now to FIG. 4, it may be observed that a block diagram 36 shows the typical steps in the supply chain with regard to strawberries, a perishable commodity. A post-harvest strawberry supply chain, FIG. 4, is relatively short, due to the perishable and fragile nature of the product. Strawberries usually possess a five to seven day shelf life absent chemical or controlled atmospheric treatment.

Strawberries are also a relatively high value product due to the short shelf life. Strawberries are typically planted in open field rows and are manually harvested by field laborers who grade and pack the same. At this point, an identifier, such as an iTOKEN label, prior discussed, is assigned to particular pallets. Strawberries are then precooled once out of the field. To ameliorate the loss of shelf life, it has been found that precooling should take place as soon as possible. Strawberries are then transferred to a distributor or cooperative who the resells the perishable goods. Once moved, the distributor then cold stores the strawberries in a warehouse. Finally, the strawberries are moved to a retailer who again cold stores the strawberries prior to display. It has been found that the ideal holding temperature for the strawberries throughout the supply chain is 32 degrees Fahrenheit. Thus, it is important to track the journey of strawberries from harvest to display and identify the determined temperatures throughout such journey. Any anomaly in temperature in any of the steps shown in FIG. 4 may result in rejection of the shipment of strawberries and pose liability to any of the entities in the chain of custody associated with the supply chain shown in FIG. 4.

While in the foregoing embodiments of the application have been set forth in considerable detail for the purposes of making a complete disclosure of the invention, numerous changes may be made in such details without departing from the spirit and principles of the invention.

What is claimed is:

1. A method of managing information concerning the supply chain of a perishable commodity during a time duration, using information from a user and a sensor and a computer screen display, utilizing the steps of:
    capturing sensor data from the sensor comprising data on the location and physical property of the perishable commodity at predetermined periods of time;
    capturing transactional data from the user on specific entities interacting with the perishable commodity during the time duration of the supply chain;
    uploading said sensor data into a data storage;
    uploading said transactional data into said data storage; and
    collating said sensor and transactional data into a chain of custody information representation and to a chain of custody diagram identifying sequential entities interacting with the perishable commodity and allowing access to said chain of custody diagram by selected users via the computer screen.

2. The method of claim 1 which additionally comprises the step of translating said transactional data from a first data format to a second data format for uploading said transactional data to said data storage.

3. The method of claim 1 in which said chain of custody diagram includes the identification of particular entities interacting with the perishable commodity and the time period associated with said interacting.

4. The method of claim 1 in which said chain of custody diagram includes identification of information related to the perishable commodity.

5. The method of claim 3 in which said chain of custody diagram includes the transactional data from the sensor representing temperature of the perishable commodity which is in possession of a particular entity.

6. The method of claim 3 in which said chain of custody diagram includes the location of the perishable commodity at said time period.

7. The method of claim 5 in which said chain of custody diagram includes a determination of the shelf life of the perishable commodity.

8. The method of claim 1 in which said chain of custody diagram includes information on inspections performed on said perishable commodity.

9. The method of claim 1 in which said sensor data comprises the temperature of the perishable commodity detected by said sensor that comprises a data logger.

10. The method of claim 1 in which said sensor data comprises the humidity of the perishable commodity detected by the sensor which comprises a data logger.

11. The method of claim 1 in which said sensor data comprises weather conditions measured by weather instruments.

12. The method of claim 1 in which additionally comprises the step of creating a copy of said transactional data prior to said step of uploading said transactional data to said data storage.

13. The method of claim 1 which additionally comprises the step of generating a user feedback relative to said chain of custody information.

14. The method of claim 12 which additionally comprises the step of translating said transactional data from a first data format to a second data format for uploading said transactional data to said data storage.

15. The method of claim 14 which additionally comprises the step of translating said transactional data from said second data format to said first data format.

16. The method of claim 12 in which said chain of custody diagram includes the identification of particular entities interacting with the perishable commodity and the time period associated with said interacting.

17. The method of claim 12 in which said chain of custody diagram includes identification information related to the perishable commodity.

18. The method of claim 16 in which said chain of custody diagram includes the temperature of the perishable commodity which is in possession of a particular entity.

19. The method of claim 16 in which said chain of custody diagram includes the location of the perishable commodity at said time period.

20. The method of claim 18 in which said chain of custody diagram includes a determination of the shelf life of the perishable commodity.

21. The method of claim 12 in which said chain of custody diagram includes information on inspections performed on said perishable commodity.

22. The method of claim 12 in which said sensor data for the sensor comprises the temperature of the perishable commodity detected by the sensor which comprises a data logger.

23. The method of claim 12 in which said sensor data from the sensor comprises weather conditions measured by weather instruments.

* * * * *